United States Patent
De Boer

(10) Patent No.: US 11,634,296 B2
(45) Date of Patent: Apr. 25, 2023

(54) METHOD AND APPARATUS FOR CORRECTING A FEEDING DISTANCE OF A STRIP FOR CUTTING

(71) Applicant: VMI HOLLAND B.V., Epe (NL)

(72) Inventor: Hans De Boer, Epe (NL)

(73) Assignee: VMI HOLLAND B.V.

( * ) Notice: Subject to any disclaimer, the term of this patent is extended or adjusted under 35 U.S.C. 154(b) by 0 days.

(21) Appl. No.: 17/769,989

(22) PCT Filed: Sep. 24, 2020

(86) PCT No.: PCT/EP2020/076747
§ 371 (c)(1),
(2) Date: Apr. 18, 2022

(87) PCT Pub. No.: WO2021/073850
PCT Pub. Date: Apr. 22, 2021

(65) Prior Publication Data
US 2022/0363506 A1    Nov. 17, 2022

(30) Foreign Application Priority Data

Oct. 18, 2019  (NL) ..................................... 2024050

(51) Int. Cl.
  *B65H 35/06*  (2006.01)
  *B29D 30/46*  (2006.01)
  (Continued)

(52) U.S. Cl.
  CPC .............. *B65H 35/06* (2013.01); *B26D 5/00* (2013.01); *B29D 30/46* (2013.01);
  (Continued)

(58) Field of Classification Search
  CPC .. B65H 35/06; B65H 2801/93; B65H 23/032; B65H 35/006; B26D 5/00; B26D 3/003;
  (Continued)

(56) References Cited

U.S. PATENT DOCUMENTS

| | | | |
|---|---|---|---|
| 2,261,837 A | * 11/1941 | Raymond | .............. B29D 30/46 |
| | | | 83/578 |
| 4,824,515 A | 4/1989 | Still et al. | .................. 156/406.4 |

(Continued)

FOREIGN PATENT DOCUMENTS

| | | | | |
|---|---|---|---|---|
| CN | 1438963 | 8/2003 | ............. | B65H 20/32 |
| CN | 106163782 | 11/2016 | ............. | B29D 30/30 |

(Continued)

OTHER PUBLICATIONS

Decision to Grant issued in Japanese Patent Appln. 2021-503035, dated Aug. 16, 2022, with English translation, 5 pages.

(Continued)

*Primary Examiner* — Jonathan G Riley
(74) *Attorney, Agent, or Firm* — Hayes Soloway P.C.

(57) ABSTRACT

A method and an apparatus for correcting a feeding distance of a strip or cutting, involves feeding the strip over the feeding distance in a feeding direction towards a cutting line that extends at an oblique cutting angle to the feeding direction; detecting a lateral position of a first longitudinal edge of the strip in a lateral direction perpendicular to the feeding direction; wherein, when the detected lateral position is offset over an offset distance in the lateral direction with respect to a reference position for the first longitudinal edge at the measuring line, and adjusting the feeding distance with a correction distance that is related to the offset distance in a ratio that is defined by the cutting angle.

23 Claims, 5 Drawing Sheets

(51) Int. Cl.
B65H 23/02 (2006.01)
B26D 5/00 (2006.01)

(52) U.S. Cl.
CPC .............. *B65H 23/0216* (2013.01); *B65H 2301/51512* (2013.01); *B65H 2511/216* (2013.01)

(58) Field of Classification Search
CPC .......... B26D 7/01; B26D 5/007; B29D 30/38; B29D 30/42
See application file for complete search history.

(56) References Cited

U.S. PATENT DOCUMENTS

| | | | | |
|---|---|---|---|---|
| 5,395,476 | A * | 3/1995 | Debroche | B29D 30/1657 156/425 |
| 6,834,823 | B2 | 12/2004 | Nauta et al. | B65H 23/192 |
| 6,994,140 | B2 | 2/2006 | Kölker et al. | 156/351 |
| 9,868,263 | B2 | 1/2018 | Shimuta et al. | B29D 30/3042 |
| 10,773,409 | B2 | 9/2020 | Meijers et al. | B26D 1/00 |
| 2003/0066610 | A1 | 4/2003 | Kolker et al. | 156/394.1 |
| 2005/0000626 | A1* | 1/2005 | Auclair | B29D 30/42 156/134 |
| 2007/0023133 | A1* | 2/2007 | Roetker | B29C 66/723 156/217 |
| 2016/0263847 | A1* | 9/2016 | Janszen | B65H 23/0326 |
| 2019/0240932 | A1 | 8/2019 | Graf | B29C 70/54 |
| 2020/0156338 | A1* | 5/2020 | De Boer | B29D 30/44 |
| 2020/0391464 | A1* | 12/2020 | Barjon | B29D 30/46 |
| 2021/0060884 | A1* | 3/2021 | Gorham | B29D 30/0016 |
| 2022/0001635 | A1* | 1/2022 | Pialot | B29D 30/28 |

FOREIGN PATENT DOCUMENTS

| | | | |
|---|---|---|---|
| CN | 109689346 | 4/2019 | ............ B29C 70/54 |
| CN | 110087872 | 8/2019 | ............ B26D 30/46 |
| JP | H03-288633 | 12/1991 | ............ B29D 30/30 |
| JP | H10-156966 | 6/1998 | ............ B29D 30/30 |
| JP | 2002-370194 | 12/2002 | ............... B26D 5/34 |
| JP | 2014-218065 | 11/2014 | ............ B29D 30/30 |
| KR | 10-2012-0140645 | 12/2012 | ........... B65H 23/038 |
| WO | WO-2011144665 A1 * | 11/2011 | ............ B29D 30/30 |
| WO | WO-2012139556 A1 * | 10/2012 | ......... B29D 30/0016 |
| WO | WO 2013/151097 | 10/2013 | ............... B26D 5/34 |
| WO | WO 2015/159801 | 10/2015 | ............ B29D 30/30 |

OTHER PUBLICATIONS

International Preliminary Report on Patentability issued in PCT/EP2020/076747, dated Apr. 19, 2022, 7 pages.
International Search Report and Written Opinion issued in PCT/EP2020/076747, dated Dec. 17, 2020, 10 pages.
Office Action issued in Japanese Patent Appln. 2021-503035, dated Mar. 22, 2022. with English translation, 8 pages.
Decision to Grant issued in Korean Patent Appln. 10-2022-7016533, dated Jan. 30, 2023, with English translation, 6 pages.
Chinese Official Action issued in Chinese Patent Appln. 202011110782.6, dated Jan. 18, 2023, with English translation, 12 pages.

* cited by examiner

METHOD AND APPARATUS FOR CORRECTING A FEEDING DISTANCE OF A STRIP FOR CUTTING

BACKGROUND

The invention relates to a method and an apparatus for correcting a feeding distance of a strip for cutting, in particular a strip for tire building.

JP 2014 218065 A discloses a method to adjust a cutting position of a belt member so that the belt member can be cut at a certain length. In the method, a belt member is cut by a belt cutter and then conveyed by a conveying means and wound around a winding body. The tip of the belt member placed on the conveying means is cut obliquely at a certain angle with respect to the longitudinal direction by the belt cutter. Next, the belt member is conveyed until the tip of the belt member formed by cutting reaches a center position of the width detection sensor, and the width of the tip is measured. When the width is wider than a reference value, the conveyance amount for conveying the rear end side of the belt member to the belt cutter is reduced. When the width is smaller than the reference value, the conveyance amount for conveying the rear end side of the belt member to the belt cutter is increased. The correction amount is expressed as $y = \tan \alpha \cdot x$, where y is the correction amount in the longitudinal direction of the belt member and x is the difference in the width direction.

SUMMARY OF THE INVENTION

The known method according to JP 2014 218065 A requires the creation of the tip prior to the measurement. In other words, the correction amount can only be determined when the leading end of the belt member has already been cut and the tip passes over the width detection sensor. The conveyance amount for conveying the rear end side of the belt member to the belt cutter is then adjusted. However, the adjustment does not take into account that the rear end side may be in a different lateral position than the tip at the leading end and that this also has a considerable effect on the length of the belt member. Moreover, the width detection sensor of JP 2014 218065 A is formed by a plurality of light emitting units and light receiving units arranged on the upper and lower sides of the belt member to measure the width. Such a width detection sensor is relatively complex and expensive.

It is an object of the present invention to provide a method and an apparatus for correcting a feeding distance of a strip for cutting, wherein the determination of the correction distance can be improved.

According to a first aspect, the invention provides a method for correcting a feeding distance of a strip for cutting, wherein the strip has a strip body extending in a longitudinal direction, a first longitudinal edge extending at first side of the strip body and a second longitudinal edge extending at a second side of the strip body opposite to the first side, wherein the method comprises the steps of:
  feeding the strip over the feeding distance in a feeding direction towards a cutting line that extends at an oblique cutting angle to said feeding direction;
  detecting a lateral position of the first longitudinal edge along a measuring line;
wherein, when the detected lateral position is offset over an offset distance in a lateral direction perpendicular to the feeding direction with respect to a reference position for the first longitudinal edge at the measuring line, the method further comprises the step of:
  adjusting the feeding distance with a correction distance that is related to the offset distance in a ratio that is defined by the cutting angle.

The lateral position of the first longitudinal edge relative to the cutting line determines where the cutting line, extending at the oblique cutting angle, will intersect—and therefore cut—the first longitudinal edge. A lateral offset may result in the cutting line intersecting with the first longitudinal edge earlier or later than expected, thus causing a short-than-expected or longer-than-expected length of the strip. As the strip is cut twice, the lateral position of the first longitudinal edge at both the leading edge and the trailing edge has a significant influence on the overall length of the strip. Moreover, the lateral offset may be different at the leading edge compared to the trailing edge, thereby potentially increasing the effect.

By detecting the lateral position of the first longitudinal edge, it can be predicted or calculated where the cutting line will intersect the first longitudinal edge and thus what the effect of any lateral offset will be on the overall length of the strip. The conveyance amount or the feeding distance can be adjusted accordingly to compensate.

The lateral position of the first longitudinal edge can be detected at any moment during the conveyance as it is not dependent on the formation of the leading edge. The detection can for example be performed prior to the cutting and/or upstream of the cutting line. Hence, the conveyance amount for both the leading edge and the trailing edge can be adjusted according to the lateral position of the first longitudinal edge at said leading edge and the trailing edge, respectively. Moreover, by adjusting the feeding distance based on the offset distance of the detected lateral position, one does not need to measure the entire width of the strip. For example, a single sensor with a relatively small detection area can be used to detect the lateral position of the first longitudinal edge. Hence, the determination of the correction distance can be simplified significantly, thus reducing the complexity and/or costs of the system as a whole.

In a preferred embodiment the lateral position of the first longitudinal edge is detected at the measuring line upstream of the cutting line with respect to the feeding direction. Hence, the feeding distance and/or the conveyance amount for both the leading edge and the trailing edge can be adjusted according to the lateral position of the first longitudinal edge at said leading edge and the trailing edge, respectively.

In a further embodiment thereof the reference position is located at the measuring line at a reference distance from the cutting line in the feeding direction, wherein the detected lateral position, when offset over the offset distance, is either at a larger distance or at a smaller distance from the cutting line in the feeding direction than the reference distance, wherein the feeding distance is adjusted by adding the correction distance to the reference distance in case of the larger distance and by subtracting the correction distance from the reference distance in case of the smaller distance. Hence, the strip can be advanced from the measuring line to the cutting line over a feeding distance such that the cutting line intersects with the detected lateral position on said first longitudinal edge.

In another embodiment the method comprises the steps of:
  comparing the detected lateral position with the reference position to determine the offset distance; and calculating the correction distance in the feeding direction by using a trigonometric function with a first parameter indicative of the cutting angle and a second parameter indicative of the offset distance as parameters; and adjusting the feeding distance based on the calculated correction distance.

A trigonometric function can provide a relatively simple way of determining the correction distance, given that the cutting angle and the offset distance are known. Preferably, the trigonometric function is a tangent. More preferably, the trigonometric function is $$\text{correction distance} = \frac{\text{offset distance}}{\tan A}$$

in which A is the cutting angle. Alternatively, the trigonometric function is $$\text{correction distance} = \frac{\tan A}{\text{offset distance}}$$

in which A is the equivalent of ninety degrees minus the cutting angle in degrees. Both functions have the same result and only differ in the way the parameter A is defined based on the cutting angle.

In yet another alternative embodiment a range of values indicative of the correction distance associated with a range of lateral positions is stored in a database, wherein the method comprises the steps of:

retrieving one value from the range of values that is associated with a lateral position from the range of lateral positions that corresponds or substantially corresponds to the detected lateral position of the first longitudinal edge and using said value as the correction distance to adjust the feeding distance.

The relationship between the correction distance and the lateral positions may be determined experimentally or mathematically prior to the steps of the aforementioned method to generate a range of values that can be readily called upon during the method. Such predefined values can be equally useful in determining the appropriate correction distance.

In another embodiment the reference position is a fixed position. The reference position may for example be the most optimal lateral position of the first longitudinal edge for cutting.

In another embodiment the method comprises the steps of:

cutting the strip at the cutting line to form a leading edge with respect to the feeding direction;

feeding the strip in the feeding direction over the feeding distance; and cutting the strip at the cutting line to form a trailing edge with respect to the feeding direction;

wherein the first longitudinal edge has an edge length in the feeding direction between the leading edge and the trailing edge; and wherein, when the lateral position of the first longitudinal edge is offset in the lateral direction at the trailing edge with respect to the leading edge, the feeding distance is adjusted with the correction distance so that the edge length is constant or substantially constant regardless of said offset. Hence, more uniform strip lengths can be obtained.

Preferably, the lateral position of the first longitudinal edge is detected at least twice along the edge length, wherein a detected first lateral position of the at least two detected lateral positions is used as the reference position for determining the offset distance for a detected second lateral position of the at least two detected lateral positions. In contrast with the embodiment that featured a fixed reference position, the current embodiment compares the two detected lateral positions with each other.

More preferably, the detected first lateral position is spaced apart from the detected second lateral position in the feeding direction over the edge length. In other words, the detected first lateral position is the lateral position of the first longitudinal edge at the leading edge and the detected second lateral position is the lateral position of the first longitudinal edge at the trailing edge. The lateral positions can thus be detected along the first longitudinal edge in the positions where ultimately the leading edge and the trailing edge are formed by cutting.

In a further embodiment the method, prior to cutting the strip to form the leading edge, comprises the steps of:

detecting a first lateral position of the first longitudinal edge at the measuring line upstream of the cutting line with respect to the feeding direction; and feeding the strip over a first part of the feeding distance that is corrected with the correction distance so that the detected first lateral position is located on the cutting line after the feeding of the strip over the first part of the feeding distance.

Consequently, the strip is positioned after the first part of the feeding distance in a position in which the cutting line intersects with the first longitudinal edge at the detected first lateral position, i.e. corresponding to where the lateral position of the first longitudinal edge was detected at the measuring line.

Preferably, the method, after cutting the strip to form the leading edge and prior to cutting the strip to form the trailing edge, comprises the steps of:

feeding the strip over a second part of the feeding distance that corresponds or substantially corresponds to the edge length minus the first part of the feeding distance;

detecting a second lateral position of the first longitudinal edge at the measuring line; and feeding the strip over a third part of the feeding distance that is corrected with the correction distance so that the detected second lateral position is located on the cutting line after the feeding of the strip over the third part of the feeding distance.

After the strip has been fed over the second part of the feeding distance, the detected second lateral position at the measuring line is representative of the lateral position where the cutting line would intersect with the first longitudinal edge. Based on the detected second lateral position, the third part of the feeding distance can then be determined and corrected to ensure that after cutting, the edge length between the first lateral position and the second lateral position matches the desired edge length for the strip.

In another embodiment the lateral position of the first longitudinal edge is detected at the measuring line upstream of the cutting line with respect to the feeding direction, wherein the cutting line converges towards the measuring line at one of the first longitudinal edge and the second longitudinal edge.

Preferably, the cutting line is adjustable to extend at an alternative oblique cutting angle to the feeding direction, wherein the cutting line converges towards the measuring line at the other of the first longitudinal edge and the second longitudinal edge, wherein the steps of the method performed in relation to the second longitudinal edge instead of the first longitudinal edge when the cutting line extends at the alternative oblique cutting angle. The adjustable cutting line allows for cutting strips at differently or oppositely inclined angles. The lateral position may be determined at either one of the first longitudinal edge and the second longitudinal edge, depending on which longitudinal edge gives the most relevant information to determine the correction distance.

In another embodiment, the measuring line extends in the lateral direction perpendicular to the feeding direction. The measuring line is thus positioned at a neutral or right angle to the feeding direction. This can greatly simplify the calculation of the correction distance, as it is not necessary to take into account any oblique angle of the measuring line and the effect thereof on the measurements.

According to a second aspect, the invention provides an apparatus for correcting a feeding distance of a strip for cutting, wherein the strip has a strip body extending in a longitudinal direction, a first longitudinal edge extending at first side of the strip body and a second longitudinal edge extending at a second side of the strip body opposite to the first side, wherein the apparatus comprises:

a cutter for cutting the strip along a cutting line;
a conveyor for feeding the strip over the feeding distance in a feeding direction towards the cutting line, wherein the cutting line extends at an oblique cutting angle to said feeding direction;
a drive for controlling the conveyor;
a sensor device for detecting a lateral position of the first longitudinal edge along a measuring line; and
a control unit that is operationally connected to the sensor device and the drive, wherein the control unit is configured for:
adjusting the feeding distance when the detected lateral position is offset over an offset distance in a lateral direction perpendicular to the feeding direction with respect to a reference position for the first longitudinal edge at the measuring line, wherein the feeding distance is adjusted with a correction distance that is related to the offset distance in a ratio that is defined by the cutting angle.

The control unit of the apparatus is arranged to control the apparatus such that the feeding distance in substantially the same way as in the method according to the first aspect of the invention. Hence, the apparatus has the same technical advantages as the method, which will not be repeated hereafter. It will also be clear that—in addition to the embodiments mentioned hereafter—the apparatus can be combined with any one of the embodiments of the method, wherein the control unit is configured for controlling and/or executing the steps of the method described therein.

In a preferred embodiment the measuring line is located upstream of the cutting line with respect to the feeding direction. Hence, the feeding distance and/or the conveyance amount for both the leading edge and the trailing edge can be adjusted according to the lateral position of the first longitudinal edge at said leading edge and the trailing edge, respectively.

In another embodiment, the measuring line extends in the lateral direction perpendicular to the feeding direction. The measuring line is thus positioned at a neutral or right angle to the feeding direction. This can greatly simplify the calculation of the correction distance, as it is not necessary to take into account any oblique angle of the measuring line and the effect thereof on the measurements.

In another preferred embodiment the sensor device comprises a first sensor for detecting the lateral position of the first longitudinal edge along the measuring line. Said first sensor can have a relatively small detection area and can be relatively simple in construction, thus reducing the complexity and/or the costs of the overall apparatus.

Preferably, the sensor device comprises a second sensor for detecting the lateral position of the second longitudinal edge, wherein the cutting line is adjustable to extend at an alternative oblique cutting angle to the feeding direction, wherein the control unit is arranged for adjusting the feeding distance in relation to the detected lateral position of the second longitudinal edge instead of the first longitudinal edge when the cutting line extends at the alternative oblique cutting angle. The second sensor has the same technical advantages as the first sensor. In addition, the provision of the second sensor allows for the lateral position to be determined at either one of the first longitudinal edge and the second longitudinal edge, depending on which longitudinal edge gives the most relevant information to determine the correction distance.

It is noted that for the purpose of determining the correction distance, it is not necessary to use both of the sensors simultaneously.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
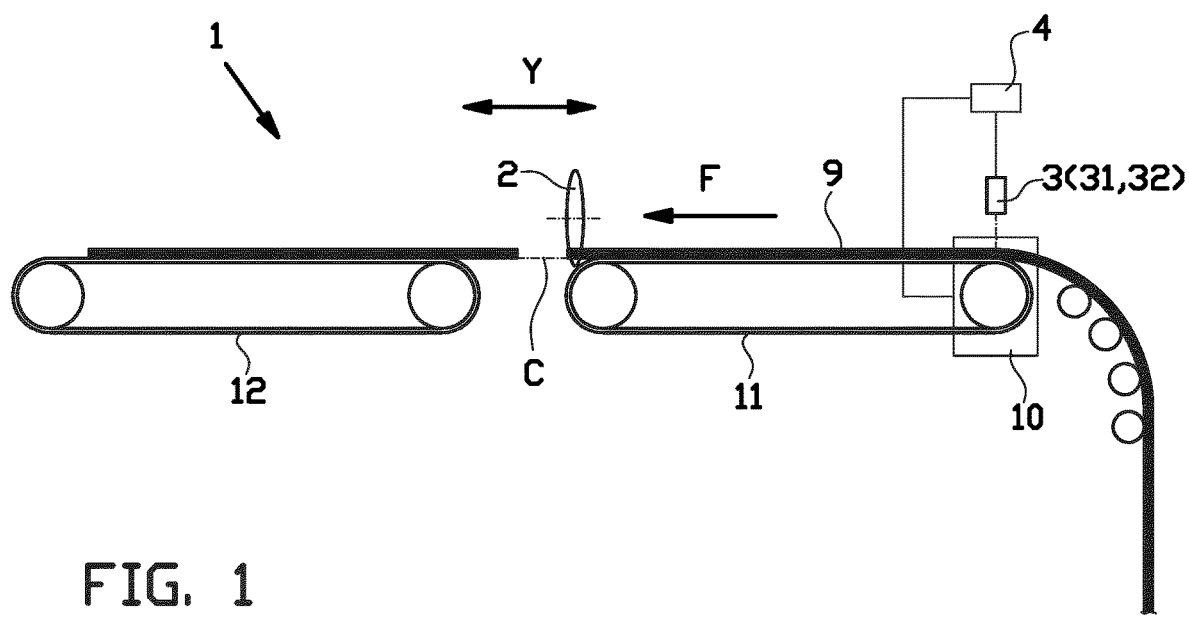
FIG. 1 shows a side view of an apparatus for correcting a feeding distance of a strip for cutting according to the invention.
Figure 2:
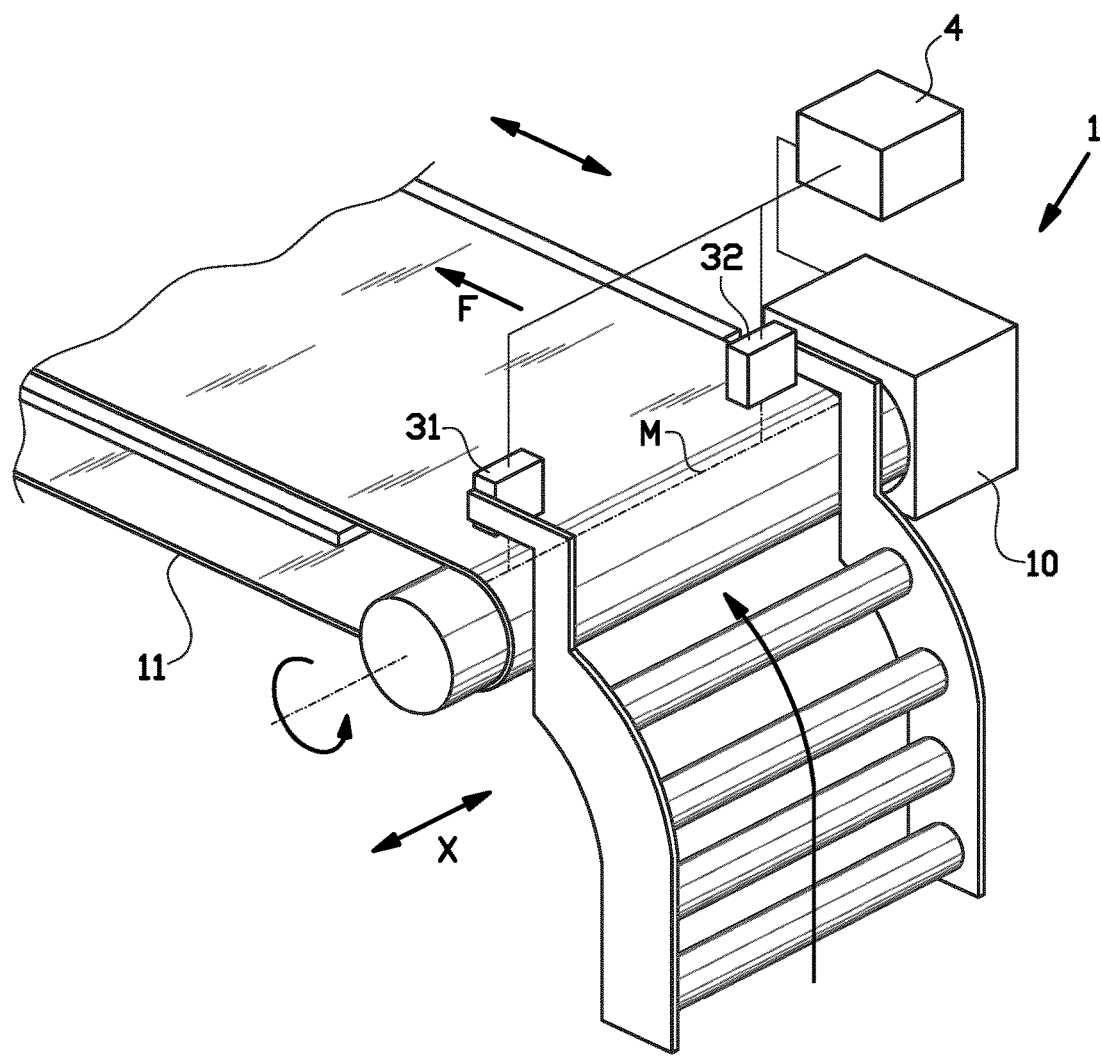
FIG. 2 shows an isometric view of the apparatus according to FIG. 1.

FIGS. 1 and 2 show an apparatus 1 for correcting a conveyance amount or feeding distance F1, F2, F3 of a strip 9 for cutting.

Figure 6:
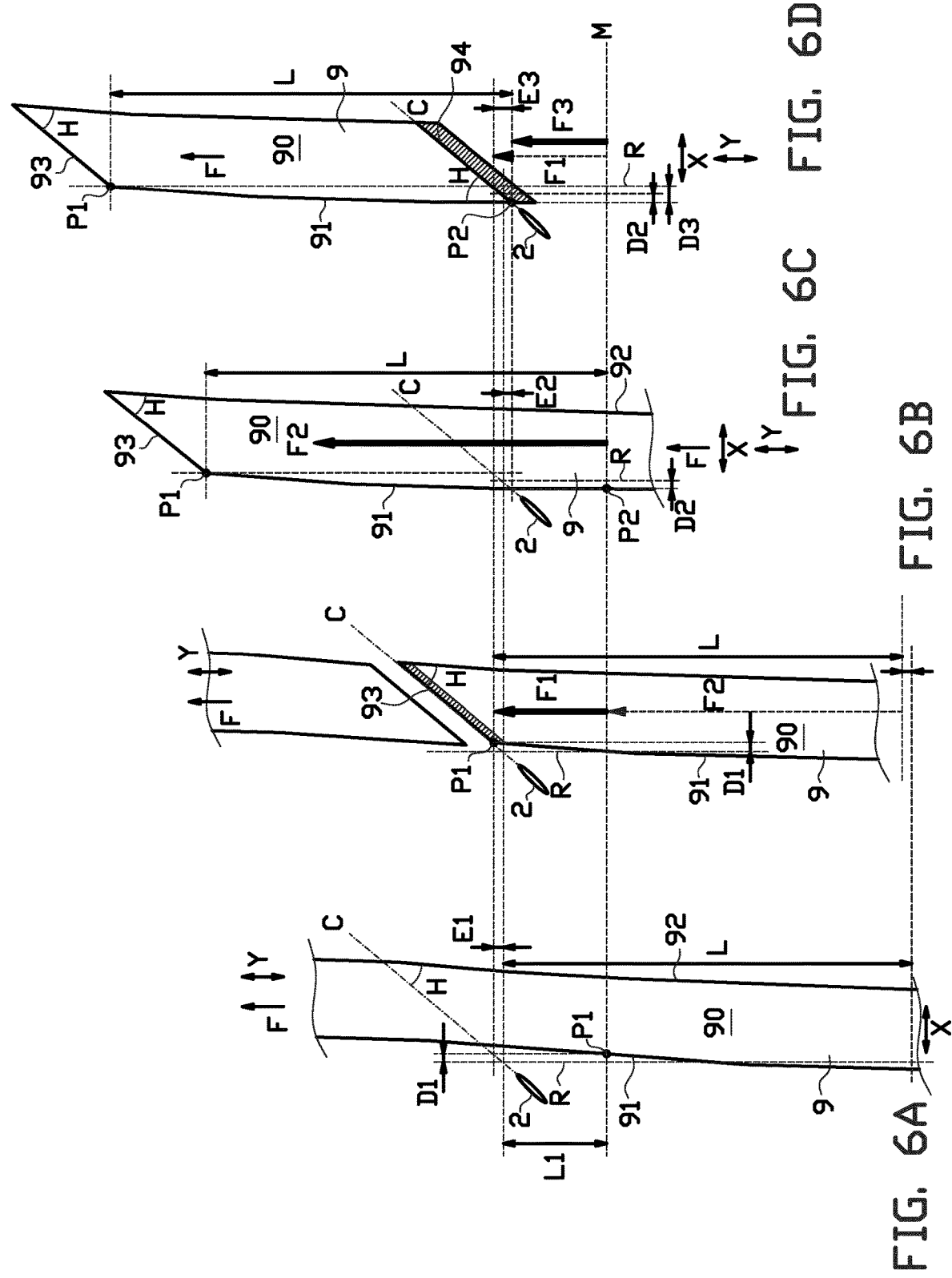
FIGS. 6A-6D show the steps of a method for correcting a feeding distance of the strip using the apparatus according to FIGS. 1 and 2.

As shown in FIG. 6A, the strip 9 has a strip body extending in a longitudinal direction Y, a first longitudinal edge 91 extending at first side of the strip body 90 and a second longitudinal edge 92 extending at a second side of the strip body 90 opposite to the first side. The longitudinal edge 91, 92 do not always extend parallel to the longitudinal direction Y. Instead, they may deviate slightly in a lateral direction X perpendicular to the longitudinal direction Y, as shown in an exaggerated manner in FIG. 6A.

The strip 9 is preferably a tire component for manufacturing a green or unvulcanized tire. In this particular example, the strip 9 is used to manufacture cord-reinforced breaker plies. Said cord-reinforced breaker plies are typically cut from a continuous strip at an oblique cutting angle parallel or substantially parallel to the direction of the reinforcement cords embedded in said continuous strip. The resulting strip 9 has a substantially rhomboid contour, as shown in FIG. 6D, which is characteristic for breaker plies. The strip 9, after cutting, forms a tire component that has a leading edge 93 and a trailing edge 94 with respect to the feeding direction F. The first longitudinal edge 91 further has an edge length L in the feeding direction F between the leading edge 93 and the trailing edge 94. Preferably, said edge length L is kept uniform over a batch of tire components.

FIG. 1 schematically shows that, in this exemplary embodiment, the apparatus 1 comprises a rear conveyor 11 and a front conveyor 12 for feeding the strip 9 in a feeding direction F across a cutting line C between the rear conveyor 11 and the front conveyor 12. Alternatively, a single conveyor (not shown) may be used that extends across the cutting line C, wherein a cutting bar, known per se, may be provided on the single conveyor to cut the strip S on the continuous surface of the single conveyor. The apparatus 1 further comprises a drive 10 for driving the rear conveyor 11. A similar drive (not shown) is arranged at the front conveyor 12.

Figure 3:
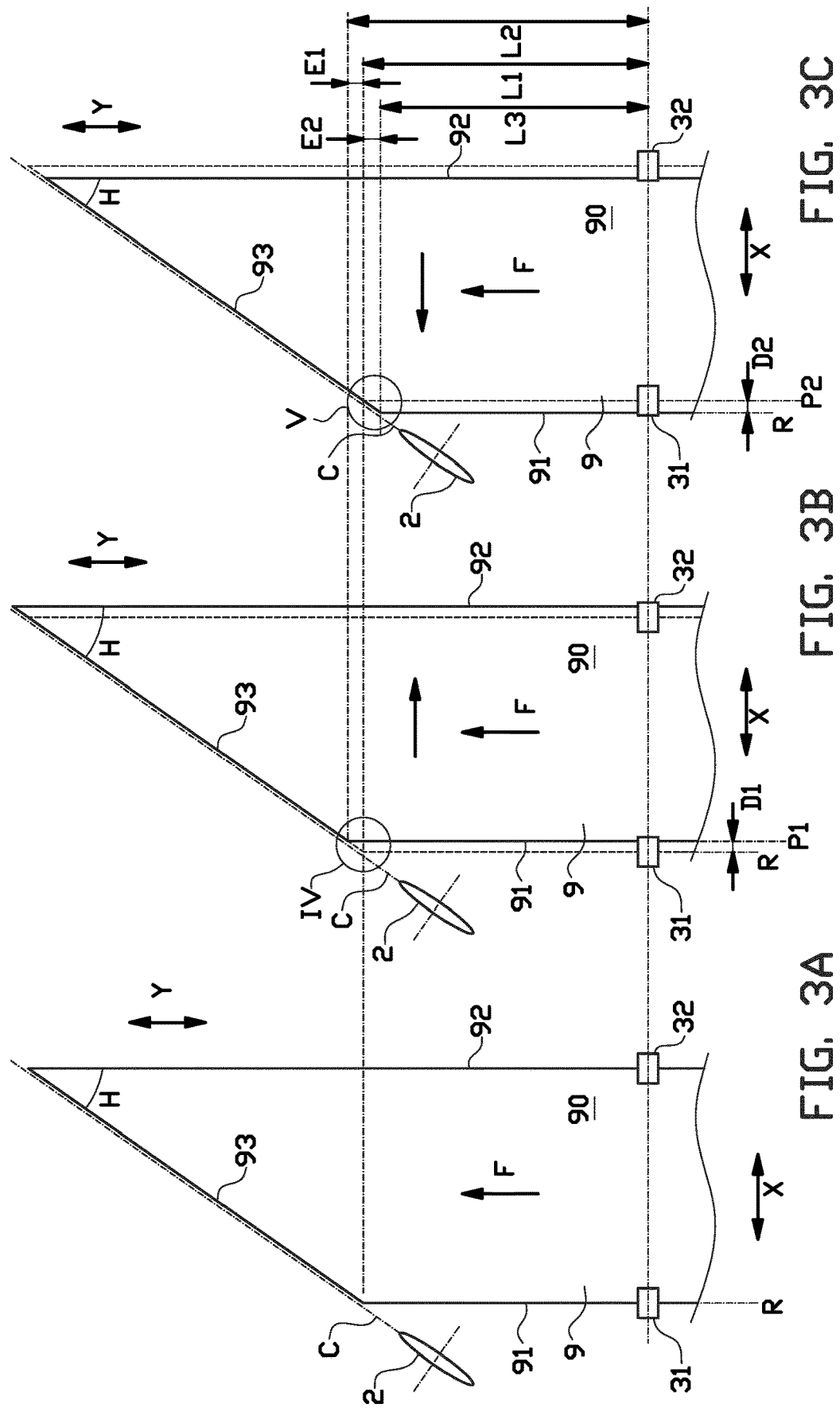
FIG. 3A shows a strip being correctly aligned and cut at a cutting line.
FIGS. 3B and 3C show top views of the strip and the potential length differences of said strip at the cutting line as a result of misalignment with respect to the correct alignment of FIG. 3A.

As shown in FIGS. 3A, 3B and 3C, the cutting line C is arranged at an oblique cutting angle H with respect to the feeding direction F. The rear conveyor 11 and the front conveyor 12 are spaced apart in the feeding direction F to facilitate bias cutting along said cutting line C. The apparatus 1 further comprises a cutter 2, i.e. a disc cutter, for cutting the strip 9 along said cutting line C. The disc cutter may cooperate with counter-member (not shown), i.e. another disc cutter or a cutting bar, in a manner known per se to obtain an accurate cut.

Preferably, the cutting angle H is adjustable, i.e. by adjusting the orientation of a cutting frame (not shown), known per se, that supports the cutter 2 relative to the rear conveyor 11, to change the orientation of the cutting line C. In particular, the cutting angle H may be adjusted within a range of ten to forty degrees with respect to the feeding direction F or it may even be moved over ninety degrees or more to obtain a cutting angle that is opposite to the cutting angle H as shown in FIG. 3A.

As shown in FIG. 1, the apparatus 1 further comprises a sensor device 3 that is arranged at or near the entry point of the strip 9 on the rear conveyor 11. The sensor device 3 is used to determine the lateral position of the first longitudinal edge 91 and/or the second longitudinal edge 92 along a measuring line M extending in the lateral direction X, as shown in FIG. 2. Alternatively, the measuring line M may extend at an oblique or non-right angle to the feeding direction F, although this will make the correction, as described hereafter, slightly more complex.

Preferably, the sensor device 3 is an optical sensor device. The sensor device 3 may for example comprise one or more imaging sensors and/or cameras. The sensor device 3 optionally comprises a laser (not shown) for projecting a laser line onto the strip 9. Alternatively, mechanical means may be used to 'feel' the lateral position of the longitudinal edges 91, 92 of the strip 9 through direct contact. The sensor device 3 is located upstream of the cutting line C with respect to the feeding direction F. In this case, the sensor device 3 is located above the rear conveyor 11. The sensor device 3 may however also be located below the rear conveyor 11, partially above and below said rear conveyor 11 or upstream of the rear conveyor 11.

In this exemplary embodiment, as best seen in FIG. 2, the sensor device 3 comprises a first sensor 31 and a second sensor 32 for detecting the lateral position of the first longitudinal edge 91 and the second longitudinal edge 92, respectively. It is noted that the invention only requires one of the sensors 31, 32 to operate. Nevertheless, the other sensor 31, 32 may be used to provide additional information or may be kept inactive during at least a part of the operation. In particular, the apparatus 1 may alternate between the first sensor 31 and the second sensor 32 depending on the lateral position of the longitudinal edge 91, 92 that is used as input for the correction, as described in more detail hereafter.

The apparatus 1 further comprises a control unit 4 that is operationally connected to the sensor device 3 and the drive 10 for controlling the drive 10, and the operation of the rear conveyor 11, in response to detection signals representative of the lateral position of the first longitudinal edge 91 and/or the second longitudinal edge 92. In particular, the control unit 4 is arranged for adjusting the feeding distance over which the strip 9 is conveyed or advanced prior to, between and/or after the cuts.

A method for correcting the feeding distance F1, F2, F3 of the strip 9 for cutting will now be elucidated with reference to FIGS. 1-7.

FIGS. 3A, 3B and 3C show the potential impact of a lateral offset distance of the first longitudinal edge 91 on the length of the strip 9. In particular, FIG. 3A shows the strip 9 being correctly aligned and cut at or along the cutting line C. More in particular, the first longitudinal edge 91 of the strip 9 is located on or is collinear with a lateral reference position R for said first longitudinal edge 91. At said lateral reference position R, the measuring line M is spaced apart from the cutting line C over a reference distance L1. In other words, when the first longitudinal edge 91 is aligned along the lateral reference position R and the strip 9 is conveyed, advanced or fed from the measuring line M over a feeding distance equal to the reference distance L1 in the feeding direction F, the length of the first longitudinal edge 91 between the measuring line M and the cutting line C will be equal to said reference distance L1.

FIGS. 3B and 3C show the potential length differences of said strip at the cutting line as a result of misalignment with respect to the correct alignment of FIG. 3A. In particular, in FIG. 3B, the first longitudinal edge 91 is offset over a first lateral offset distance D1 in the lateral direction X with respect to the lateral reference position R. When the strip 9 is advanced over the same distance in the feeding direction F as in FIG. 3A, the length of the first longitudinal edge 91 between the measuring line M and the cutting line C has effectively increased to a larger length L2 than the reference distance L1. FIG. 3C shows that when the first longitudinal edge 91 is offset in the opposite direction over a second lateral offset distance D2, the length of the first longitudinal edge 91 between the measuring line M and the cutting line C has effectively decreased to a smaller length L3 than the reference distance L1.

Figure 4:
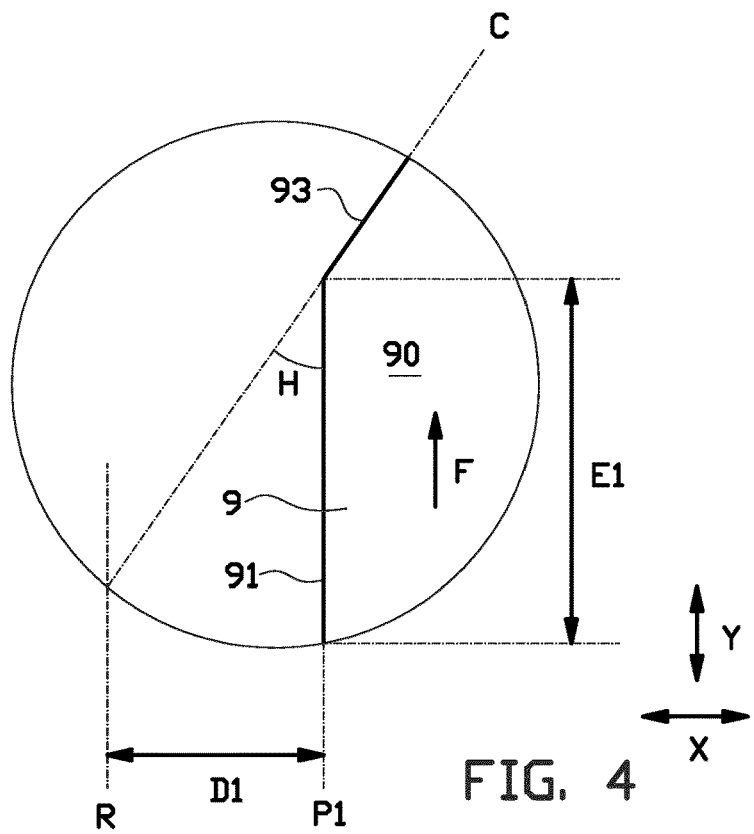
FIG. 4 shows a detail of the length difference according to the circle IV in FIG. 3B.
Figure 5:
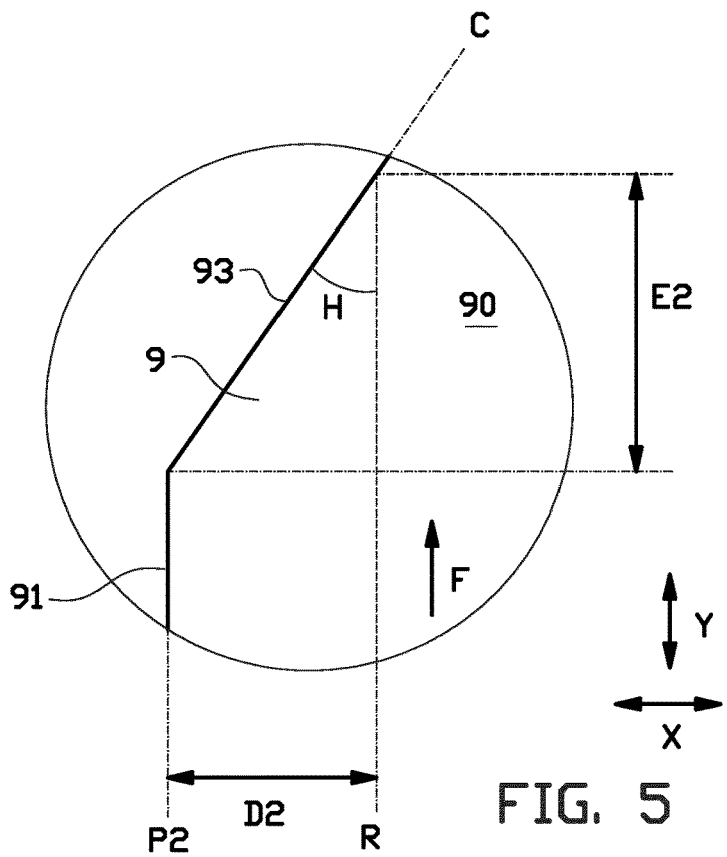
FIG. 5 shows a detail of the length difference according to the circle V in FIG. 3C.

The method according to the present invention intends to compensate for these length differences by determining a correction distance E1, E2, as shown in more detail in FIGS. 4 and 5, based on the lateral offset distance D1, D2 and by adding or subtracting said correction distance E1, E2 from the feeding distances F1, F2, F3, as shown in FIGS. 6A-6D, over which the strip S is conveyed in the feeding direction F.

To determine the correction distance E1, E2, the method according to the present invention comprises the following steps:

feeding the strip 9 over the feeding distance F1, F2, F3 in a feeding direction F towards a cutting line C that extends at an oblique cutting angle H to said feeding direction F; and detecting, at some point during the feeding, the lateral position P1, P2 of the first longitudinal edge 91 along the measuring line M.

As shown in FIGS. 6A-6D, when the detected lateral position P1, P2 is offset over an offset distance D1, D2, D3 in the lateral direction X with respect to the reference position R for the first longitudinal edge 91 at the measuring line M, the method further comprises the step of:

adjusting at least a part of the feeding distance F1, F2, F3 with a correction distance E1, E2, E3 that is related to the offset distance D1, D2 in a ratio that is defined by the cutting angle H.

The offset distance D1, D2, D3 can be determined by comparing the detected lateral position P1, P2 with the reference position R. Based on said the determined offset distance D1, D2, D3, one can calculate the correction distance E1, E2, E3 in the feeding direction F by using a trigonometric function, preferably a tangent, with a first parameter indicative of the cutting angle H and a second parameter indicative of the offset distance D1, D2, D3 as parameters. The cutting angle H may be entered into the apparatus 1 through manual input by an operator or the cutting angle H may be determined automatically, i.e. with suitable sensor means.

The tangent trigonometric function can be expressed as $$\text{correction distance} = \frac{\text{offset distance}}{\tan A}$$

in which A is the cutting angle H.

Alternatively, the tangent trigonometric function may be expressed as $$\text{correction distance} = \frac{\tan A}{\text{offset distance}}$$

in which A is the equivalent of ninety degrees minus the cutting angle H in degrees.

In yet a further alternative embodiment, a range of values indicative of the correction distance E1, E2, E3 associated with a range of lateral positions P1, P2 is stored in a database. The database may be part of the control unit 4 or located at a different location. When using predetermined data from a database, the relationship between the correction distance E1, E2, E3 and the cutting angle H is not actively calculated. Instead, it may be determined by simply retrieving one value from the range of values that is associated with a lateral position P1, P2 from the range of lateral positions P1, P2 that corresponds or substantially corresponds to the detected lateral position P1, P2 of the first longitudinal edge 91.

FIGS. 6A-6D show in more detail which parts of the feeding distance F1, F2, F3 are corrected at which moment and based on which detected lateral positions P1, P2.

In particular, FIG. 6A shows the strip 9 with a section of the strip body 90 that is still continuous, i.e. uncut. At a certain moment in time, prior to the cutting of the leading edge 93, a first lateral position P1 of the first longitudinal edge 91 is detected at the measuring line M upstream of the cutting line C with respect to the feeding direction F. The detection can be done by the first sensor 31 as shown in FIG. 2. The second sensor 32 is not required and may be inactive. The control unit 4 receives detection signals representative of the first lateral position P1 from the sensor device 3 and determines a first correction distance E1 based on the aforementioned relationship between the first lateral position P1 and the cutting angle H.

As shown in FIG. 6B, the strip 9 is subsequently fed over a first part F1 of the feeding distance F1, F2, F3 to move the part of the strip 9 that was located on the measuring line M during the detection of the first lateral position P1 towards the cutting line C. The first part F1 of the feeding distance F1, F2, F3 is corrected with the correction distance E1 such that the detected first lateral position P1 is located on the cutting line C after the feeding. More specifically, the first part F1 of the feeding distance F1, F2, F3 is equal to the reference length L corrected with the first correction distance E1. In other words, after the feeding over the first part F1 of the feeding distance F1, F2, F3, the cutting line C intersects with the first longitudinal edge 91 in the first lateral position P1. Hence, when cutting into the strip 9 at said first lateral position P1, the impact of said first lateral position P1 on the overall length of the tire component is known and appropriate action is/can be taken to compensate.

Note that the hatched part of the strip 9 in FIG. 6B is the part of the strip 9 that would have cut-off if no correction distance E1 was applied to the first part F1 of the feeding distance F1, F2, F3.

FIG. 6C shows the situation after the strip 9 has been cut to form the leading edge 93 and prior to cutting the strip 9 to form the trailing edge 94. Before the trailing edge 94 is cut, an operator has input a parameter to set the length of the tire component. Typically, said parameter is an edge length L for the first longitudinal edge 91 or the second longitudinal edge 92. In this case, a predefined edge length L for the first longitudinal edge 91 is given. As shown in FIG. 6C, the strip 9 has been fed over a second part F2 of the feeding distance F1, F2, F3 that corresponds or substantially corresponds to the predefined edge length L minus the first part F1 of the feeding distance F1, F2, F3. Consequently, the strip 9 is now located with a section of the strip body 90 at the measuring line M where the strip 9 would be cut to create the trailing edge 94 based on the predefined edge length L.

To ensure that the cutter 2 actually cuts into the strip 9 at the predefined edge length L, a second lateral position P2 of the first longitudinal edge 91 is detected at the measuring line M in the situation as shown in FIG. 6C. The detection can again be performed solely by the first sensor 31 as shown in FIG. 2. The control unit 4 receives detection signals representative of the second lateral position P2 from the sensor device 3 and determines a second lateral offset distance D2 by comparing the detected second lateral position P2 with the reference position R. The control unit 4 can subsequently determine a second correction distance E2 based on the aforementioned relationship between the second lateral offset distance D2 and the cutting angle H.

Alternatively, the control unit 4 may compare the detected second lateral position P2 with the detected first lateral position P1 and determine a third or offset distance D3 based on the difference between said two lateral positions P1, P2. The control unit 4 may then determine a third or overall correction distance E3 based on the aforementioned relationship between the third or overall lateral offset distance D3 and the cutting angle H.

Now that the second lateral position P2 of the first longitudinal edge 91 is known and the second correction distance E2 (or the overall correction distance E3) has been determined, the strip 9 can be fed further over a third part F3 of the feeding distance F1, F2, F3, as shown in FIG. 6D. The third part F3 of the feeding distance F1, F2, F3 is corrected with the second correction distance E2 so that the detected second lateral position P2 is located on the cutting line C. In particular, the third part F3 of the feeding distance F1, F2, F3 is equal to the reference distance L1, as shown in FIG. 3A, corrected with the second correction distance E2. Alternatively, the third part F3 of the feeding distance F1, F2, F3 is equal to the first part F1 of the feeding distance F1 corrected with the overall correction distance E3. The strip 9 may now be cut along the cutting line C to create the trailing edge 94. Note that the cutting line C intersects with the first longitudinal edge 91 exactly at the edge length L. Hence, a tire component can be obtained with an edge length L that is constant or substantially constant regardless of the offset of the first longitudinal edge 91 in the lateral direction X.

Note that the hatched part of the strip 9 in FIG. 6D is the part of the strip 9 that would have been included if no correction distance E2, E3 was applied to the third part F3 of the feeding distance F1, F2, F3.

It will be understood that the trailing edge 94 of the tire component created during the abovementioned steps of the method inherently creates a leading edge 93 at the strip 9 directly upstream of said tire component. The creation of said leading edge 93 forms the start of a next cycle of the method. The detection of the second lateral position P2 in FIG. 6C may therefore be simultaneously the detection of the first lateral position P1 of a next cycle of the method, i.e. for cutting a next tire component out of the continuous strip 9. In other words, the detected second lateral position P2 may be used for determining the correction distance E2 required to obtain the desired edge length L of the current tire component, while the same correction distance E2 is also used as the correction distance E1 for cutting the leading edge 93 of the next tire component.

Figure 7:
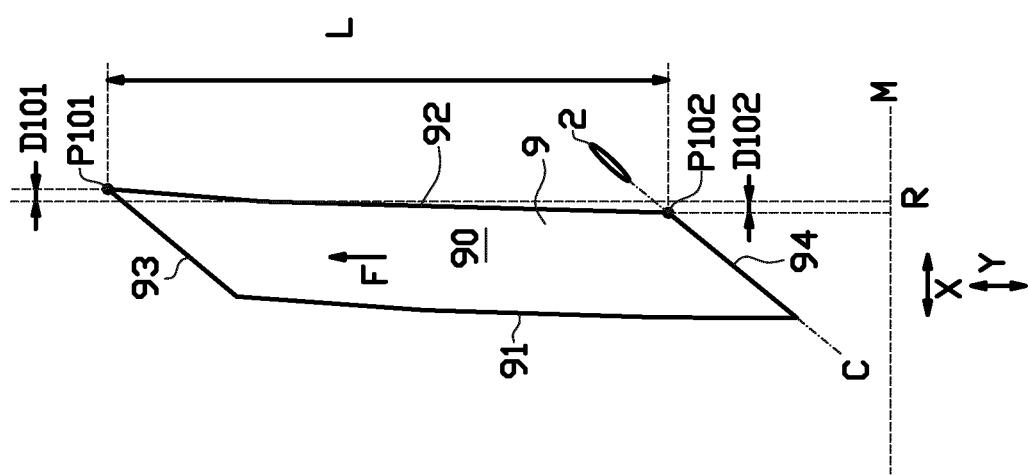
FIG. 7 shows the steps of an alternative method for correcting a feeding distance of the strip using the apparatus according to FIGS. 1 and 2.

FIG. 7 illustrates schematically that the same or a similar detection and determination can also be performed along the second longitudinal edge 92 as if it were the first longitudinal edge 91. In particular, the second sensor 32 of FIG. 2 may be used to determine the lateral offset distances D101, D102 of the detected first lateral position P101 and the detected second lateral position P102 with respect to a reference position R for the second longitudinal edge 92. The embodiment of FIG. 7 has the additional advantage that the leading edge 93 can be cut from the sharp leading tip at the intersection between the second longitudinal edge 92 and the leading edge 93 towards the first longitudinal edge 91, which can provide greater accuracy when creating the leading tip.

It will further be appreciated that, when the cutting angle H is adjusted to an alternative cutting angle opposite to the cutting angle H as shown in FIG. 6A, the steps of the aforementioned method can be performed in relation to the second longitudinal edge 92 instead of the first longitudinal edge 91 in a similar way as in FIG. 7.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary, the invention relates to a method for correcting a feeding distance F1, F2, F3 of a strip 9 for cutting, wherein the method comprises the steps of:

feeding the strip 9 over the feeding distance F1, F2, F3 in a feeding direction F towards a cutting line C that extends at an oblique cutting angle H to said feeding direction F;

detecting a lateral position P1, P2 of a first longitudinal edge 91 of the strip 9 in a lateral direction X perpendicular to the feeding direction F;

wherein, when the detected lateral position P1, P2 is offset over an offset distance D1, D2, D3 in the lateral direction X with respect to a reference position R for the first longitudinal edge 91 at the measuring line M, the method further comprises the step of:

adjusting the feeding distance F1, F2, F3 with a correction distance E1, E2, E3 that is related to the offset distance D1, D2 in a ratio that is defined by the cutting angle H.

LIST OF REFERENCE NUMERALS 1 apparatus
10 drive
11 rear conveyor
12 front conveyor
2 cutter
3 measuring device
31 first sensor
32 second sensor
4 control unit
9 strip
90 strip body
91 first longitudinal edge
92 second longitudinal edge
93 leading edge
94 trailing edge
C cutting line
D1 first lateral offset distance
D2 second lateral offset distance
D3 third lateral offset distance
E1 first correction distance
E2 second correction distance
E3 third correction distance
F feeding direction
F1 first part of feeding distance
F2 second part of feeding distance
F3 third part of feeding distance
H cutting angle
L (predefined) edge length
L1 reference distance
L2 larger length
L3 smaller length
M measuring line
P1 first detected lateral position
P2 second detected lateral position
R reference position
X lateral direction
Y longitudinal direction

The invention claimed is:

1. A method for correcting a feeding distance of a strip for cutting, wherein the strip has a strip body extending in a longitudinal direction, a first longitudinal edge extending at first side of the strip body and a second longitudinal edge extending at a second side of the strip body opposite to the first side, wherein the method comprises the steps of:

feeding the strip over the feeding distance in a feeding direction towards a cutting line that extends at an oblique cutting angle to said feeding direction;

detecting a lateral position of the first longitudinal edge along a measuring line;

wherein, when the detected lateral position is offset over an offset distance in a lateral direction perpendicular to the feeding direction with respect to a reference position for the first longitudinal edge at the measuring line, the method further comprises the step of:

adjusting the feeding distance with a correction distance that is related to the offset distance in a ratio that is defined by the cutting angle.

2. The method according to claim 1, wherein the lateral position of the first longitudinal edge is detected at the measuring line upstream of the cutting line with respect to the feeding direction.

3. The method according to claim 2, wherein the reference position is located at the measuring line at a reference distance from the cutting line in the feeding direction, wherein the detected lateral position, when offset over the offset distance, is either at a larger distance or at a smaller distance from the cutting line in the feeding direction than the reference distance, wherein the feeding distance is adjusted by adding the correction distance to the reference distance in case of the larger distance and by subtracting the correction distance from the reference distance in case of the smaller distance.

4. The method according to claim 1, wherein the method comprises the steps of:

comparing the detected lateral position with the reference position to determine the offset distance; and calculating the correction distance in the feeding direction by using a trigonometric function with a first parameter indicative of the cutting angle and a second parameter indicative of the offset distance as parameters; and adjusting the feeding distance based on the calculated correction distance.

5. The method according to claim 4, wherein the trigonometric function is a tangent.

6. The method according to claim 5, wherein the trigonometric function is $$\text{correction distance} = \frac{\text{offset distance}}{\tan A}$$

in which A is the cutting angle.

7. The method according to claim 5, wherein the trigonometric function is correction distance=tan A·offset distance in which A is the equivalent of ninety degrees minus the cutting angle in degrees.

8. The method according to claim 1, wherein a range of values indicative of the correction distance associated with a range of lateral positions is stored in a database, wherein the method comprises the steps of:

retrieving one value from the range of values that is associated with a lateral position from the range of lateral positions that corresponds to the detected lateral position of the first longitudinal edge and using said value as the correction distance to adjust the feeding distance.

9. The method according to claim 1, wherein the reference position is a fixed position.

10. The method according to claim 1, wherein the method comprises the steps of:

cutting the strip at the cutting line to form a leading edge with respect to the feeding direction;

feeding the strip in the feeding direction over the feeding distance; and cutting the strip at the cutting line to form a trailing edge with respect to the feeding direction;

wherein the first longitudinal edge has an edge length in the feeding direction between the leading edge and the trailing edge; and wherein, when the lateral position of the first longitudinal edge is offset in the lateral direction at the trailing edge with respect to the leading edge, the feeding distance is adjusted with the correction distance so that the edge length is constant regardless of said offset.

11. The method according to claim 10, wherein the lateral position of the first longitudinal edge is detected at least twice along the edge length, wherein a detected first lateral position of the at least two detected lateral positions is used as the reference position for determining the offset distance for a detected second lateral position of the at least two detected lateral positions.

12. The method according to claim 11, wherein the detected first lateral position is spaced apart from the detected second lateral position in the feeding direction over the edge length.

13. The method according to claim 11, wherein the detected first lateral position is the lateral position of the first longitudinal edge at the leading edge and the detected second lateral position is the lateral position of the first longitudinal edge at the trailing edge.

14. The method according to claim 10, wherein the method, prior to cutting the strip to form the leading edge, comprises the steps of:

detecting a first lateral position of the first longitudinal edge at the measuring line upstream of the cutting line with respect to the feeding direction; and feeding the strip over a first part of the feeding distance that is corrected with the correction distance so that the detected first lateral position is located on the cutting line after the feeding of the strip over the first part of the feeding distance.

15. The method according to claim 14, wherein the method, after cutting the strip to form the leading edge and prior to cutting the strip to form the trailing edge, comprises the steps of:

feeding the strip over a second part of the feeding distance that corresponds to the edge length minus the first part of the feeding distance;

detecting a second lateral position of the first longitudinal edge at the measuring line; and feeding the strip over a third part of the feeding distance that is corrected with the correction distance so that the detected second lateral position is located on the cutting line after the feeding of the strip over the third part of the feeding distance.

16. The method according to claim 1, wherein the oblique cutting angle is adjustable.

17. The method according to claim 1, wherein the measuring line extends in the lateral direction perpendicular to the feeding direction.

18. An apparatus for correcting a feeding distance of a strip for cutting, wherein the strip has a strip body extending in a longitudinal direction, a first longitudinal edge extending at first side of the strip body and a second longitudinal edge extending at a second side of the strip body opposite to the first side, wherein the apparatus comprises:

a cutter for cutting the strip along a cutting line;

a conveyor for feeding the strip over the feeding distance in a feeding direction towards the cutting line, wherein the cutting line extends at an oblique cutting angle to said feeding direction;

a drive for controlling the conveyor;

a sensor device for detecting a lateral position of the first longitudinal edge along a measuring line; and a control unit that is operationally connected to the sensor device and the drive, wherein the control unit is configured for:

adjusting the feeding distance when the detected lateral position is offset over an offset distance in a lateral direction perpendicular to the feeding direction with respect to a reference position for the first longitudinal edge at the measuring line, wherein the feeding distance is adjusted with a correction distance that is related to the offset distance in a ratio that is defined by the cutting angle.

19. The apparatus according to claim 18, wherein the measuring line is located upstream of the cutting line with respect to the feeding direction.

20. The apparatus according to claim 18, wherein the measuring line extends in the lateral direction perpendicular to the feeding direction.

21. The apparatus according to claim 18, wherein the sensor device comprises a first sensor for detecting the lateral position of the first longitudinal edge along the measuring line.

22. The apparatus according to claim 21, wherein the sensor device comprises a second sensor for detecting the lateral position of the second longitudinal edge.

23. The apparatus according to claim 18, wherein the oblique cutting angle is adjustable.

\* \* \* \* \*